(12) United States Patent
Meade

(10) Patent No.: US 11,199,698 B2
(45) Date of Patent: Dec. 14, 2021

(54) ADAPTABLE LENS COVER ASSEMBLY

(71) Applicant: High Country Innovations, LLC, Monument, CO (US)

(72) Inventor: Daniel R. Meade, Monument, CO (US)

(73) Assignee: High Country Innovations, LLC, Monument, CO (US)

( * ) Notice: Subject to any disclaimer, the term of this patent is extended or adjusted under 35 U.S.C. 154(b) by 577 days.

(21) Appl. No.: 15/467,935

(22) Filed: Mar. 23, 2017

(65) Prior Publication Data

US 2017/0285334 A1   Oct. 5, 2017

Related U.S. Application Data

(60) Provisional application No. 62/316,308, filed on Mar. 31, 2016.

(51) Int. Cl.
*G02B 27/00* (2006.01)
*G02B 7/02* (2021.01)
*G02B 23/16* (2006.01)

(52) U.S. Cl.
CPC ........... *G02B 27/0006* (2013.01); *G02B 7/02* (2013.01); *G02B 23/16* (2013.01)

(58) Field of Classification Search
CPC ...... G02B 27/0006; G02B 23/16; G02B 7/02; G02B 23/18; G02B 7/023; G02B 3/14; G02B 7/022; G02B 7/026; G02B 7/102; G03B 21/54; G03B 11/041; G03B 11/06; G03B 17/02; G03B 11/045; G03B 21/145; G03B 21/142; F41G 1/383; A61B 1/00142

USPC ......................................................... 359/511
See application file for complete search history.

(56) References Cited

U.S. PATENT DOCUMENTS

| | | | | |
|---|---|---|---|---|
| 2,488,188 A * | 5/1947 | Halvorson | ............... | F41G 1/383 359/511 |
| 2,738,585 A * | 3/1956 | Ellinn | ..................... | F41G 1/383 359/511 |
| 3,873,823 A * | 3/1975 | Northrup | ............. | G01C 15/002 362/269 |
| 4,239,327 A * | 12/1980 | Grant | ..................... | G02B 5/005 351/46 |
| 4,777,730 A * | 10/1988 | Huggins | ................... | F41G 1/00 42/119 |
| 4,899,450 A * | 2/1990 | Huggins | ................... | F41G 1/00 42/119 |
| 6,416,189 B1 * | 7/2002 | Watson | .................. | G02B 23/16 359/511 |
| 7,721,480 B2 * | 5/2010 | Campean | ................ | F41G 1/383 42/129 |
| 2015/0226960 A1 * | 8/2015 | Cheng | ................ | G02B 27/0006 359/511 |

\* cited by examiner

*Primary Examiner* — Stephone B Allen
*Assistant Examiner* — Rahman Abdur
(74) *Attorney, Agent, or Firm* — Faegre Drinker Biddle & Reath LLP

(57) ABSTRACT

The present disclosure relates generally to optical devices. In particular, the present disclosure provides systems and devices relating to adaptable lens cover assemblies for protecting the optics of various optical devices, such as spotting scopes, telescopes, riflescopes and binoculars. The adaptable lens cover assemblies of the present disclosure are configured to protect the lenses of wide a range of optical devices, and enhance the overall durability and usefulness of an optical device.

20 Claims, 5 Drawing Sheets

ADAPTABLE LENS COVER ASSEMBLY

CROSS-REFERENCE TO RELATED APPLICATION

This application claims priority to Provisional Application No. 62/316,308 filed Mar. 31, 2016, which is herein incorporated by reference in its entirety.

FIELD OF THE DISCLOSURE

The present disclosure relates to optical devices. More specifically, the present disclosure relates to adaptable lens cover assemblies for protecting the optics of various optical devices, such as spotting scopes, telescopes, riflescopes, binoculars and night-vision devices.

BACKGROUND

Optical devices to aid in the visualization of objects have been developed for a variety of different fields and for a variety of different purposes. For example, microscopes have enhanced the ability of scientists to visualize cells and subcellular objects; telescopes enhance the ability of astronomers to view and predict planetary movement; binoculars enhance the ability to identify distant objects quickly and conveniently in the field; and night-vision devices enhance the ability of a user to identify an object in the distance in low light conditions.

Additionally, a telescopic sight, commonly called a scope, is a sighting device that is based on an optical refracting telescope. These optical devices have enhanced the marksmanship of soldiers and gun enthusiasts. Scopes may be equipped with some form of graphic image pattern (e.g., a reticle) mounted in an optically appropriate position in their optical system to give an accurate aiming point. Scopes may be used with all types of systems that require accurate aiming but are most commonly found on firearms, particularly rifles. Other types of sights include iron sights, reflector (reflex) sights, and laser sights. In some cases, the optical components may be combined with optoelectronics to form a night scope.

Regardless of the purpose or field of use, the lenses of scopes, sights and optical devices only provide optical benefits to the user if they are not damaged. Therefore, protecting the lenses of scopes and sights, especially for optical devices that are used in the field where they may be damaged and/or scratched, is essential for the optical device to maintain its benefits to a user.

SUMMARY

Embodiments of the present disclosure include an optical lens cover assembly comprising an adjustable lens cover body having an open circle configuration, wherein one end of the open circle of the lens cover body is coupleable to the other end of the open circle of the lens cover body by a clamping mechanism, a lens cap including a hinge mechanism, wherein the lens cap comprises a magnetic coupling portion for securing the lens cap in a closed position, and wherein the lens cap may comprise at least one release tab for releasing the lens cap to expose one or more lenses of an optical device, and wherein the lens cover body is configured to circumferentially engage and rotate freely around an external portion the optical device until a desired position on the optical device is obtained, after which the clamp mechanism is activated to secure the lens cover body on the optical device.

The lens cover assembly described hereinabove, wherein the clamping mechanism comprises one or more of a screw mechanism, a threaded insert and screw mechanism, a pull-action clamp mechanism, a hook and screw clamping mechanism, a quick release mechanism, a ratcheting tie mechanism, a latching teeth and release mechanism, or combinations thereof.

The lens cover assembly described hereinabove, wherein the lens cover body is non-threaded.

The lens cover assembly described hereinabove, wherein the lens cover body is configured to circumferentially engage the external portions of optical devices having external diameters ranging from about 16 mm to about 20 mm, about 20 mm to about 24 mm, about 24 mm to about 28 mm, about 28 mm to about 32 mm, about 32 mm to about 36 mm, about 36 mm to about 40 mm, about 40 mm to about 44 mm, about 44 mm to about 48 mm, about 48 mm to about 52 mm, about 52 mm to about 56 mm, about 56 mm to about 60 mm, about 60 mm to about 64 mm, about 64 mm to about 68 mm, about 68 mm to about 72 mm, about 72 mm to about 76 mm, about 76 mm to about 80 mm, about 80 mm to about 84 mm, and about 84 mm to about 88 mm.

The lens cover assembly described hereinabove, wherein the hinge mechanism is configured to bias the lens cap in an open position and comprises one or more of an enclosed spring, an elastic cushion, or combinations thereof.

The lens cover assembly described hereinabove, wherein the hinge mechanism further comprises a mechanical stop insert to prevent the lens cap from opening beyond a predetermined position.

The lens cover assembly described hereinabove, wherein the hinge mechanism further comprises a damping insert to slow the movement of the lens cap to the open position.

The lens cover assembly described hereinabove, wherein the magnetic coupling portion comprises one or more magnets in the lens cap that engage an attractive metal directly opposite the one or more magnets in a portion of the lens cover body.

The lens cover assembly described hereinabove, wherein the magnetic coupling portion comprises one or more magnets in the lens cover body that engage with an attractive metal directly opposite the one or more magnets in a portion of the lens cap.

The lens cover assembly descibed hereinabove, wherein the magnetic coupling portion is located in a position that is generally opposite that of the hinge mechanism.

The lens cover assembly described hereinabove, wherein the at least one release tab is an extension of the lens cap and extends slightly beyond the underlying portion of the lens cover body when the lens cap is in the closed position.

The lens cover assembly described hereinabove, wherein the at least one release tab is located in a position that is generally opposite that of the hinge mechanism.

The lens cover assembly described hereinabove, further comprising at least one O-ring seal configured to engage the circumference of the inner portion of the lens cap and the circumference of the inner portion of the lens cover body such that when the lens cap is closed, the O-ring seal prevents water from coming into contact with the one or more lenses of the optical device.

The lens cover assembly described hereinabove, further comprising at least one O-ring seal configured to engage the circumference of the inner portion of the lens cover body and the circumference of the external portion of the optical device such that when the clamping mechanism is activated, the O-ring seal prevents water from coming into contact with the one or more lenses of the optical device.

The lens cover assembly described hereinabove, wherein the optical device is a scope, a sight, a riflescope, a spotting scope, a telescope, a field microscope, binoculars, and the like.

The lens cover assembly described hereinabove, wherein the lens cover body is comprised of one or more of a metal, a metal alloy (e.g., aluminum, titanium, steel, stainless steel and any alloys thereof), plastic, a polymeric material, carbon fiber, rubber, wood or combinations thereof.

The lens cover assembly described hereinabove, wherein the lens cap is comprised of one or more of a metal, a metal alloy (e.g., aluminum, titanium, steel, stainless steel and any alloys thereof), plastic, a polymeric material, carbon fiber, rubber, wood or combinations thereof.

The lens cover assembly described hereinabove, wherein the lens cover body is from about 0.1 mm to about 10 mm thick, and from about 1.0 mm to about 50 mm wide.

Embodiments of the present disclosure also include a kit comprising one or more lens cover assemblies of claim 1.

The kit described hereinabove, wherein the kit comprises two lens cover assemblies of claim 1, one lens cover assembly for each end of an optical device wherein one or more lenses of the optical device are exposed.

These and other advantages will be apparent from the disclosure of the aspects, embodiments, and configurations contained herein.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as $X_1$-$X_n$, $Y_1$-$Y_m$, and $Z_1$-$Z_o$, the phrase is intended to refer to a single element selected from X, Y, and Z, a combination of elements selected from the same class (for example, $X_1$ and $X_2$) as well as a combination of elements selected from two or more classes (for example, $Y_1$ and $Z_o$).

It is to be noted that the term "a" or "an" entity refers to one or more of that entity. As such, the terms "a" (or "an"), "one or more" and "at least one" may be used interchangeably herein. It is also to be noted that the terms "comprising", "including", and "having" may be used interchangeably.

The term "means" as used herein shall be given its broadest possible interpretation in accordance with 35 U.S.C. Section 112(f). Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

It should be understood that every maximum numerical limitation given throughout the present disclosure is deemed to include each and every lower numerical limitation as an alternative, as if such lower numerical limitations were expressly written herein. Every minimum numerical limitation given throughout the present disclosure is deemed to include each and every higher numerical limitation as an alternative, as if such higher numerical limitations were expressly written herein. Every numerical range given throughout the present disclosure is deemed to include each and every narrower numerical range that falls within such broader numerical range, as if such narrower numerical ranges were all expressly written herein.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

BRIEF DESCRIPTION OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure may be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

DETAILED DESCRIPTION

The present disclosure relates generally to optical devices. In particular, the present disclosure provides systems and devices relating to adaptable lens cover assemblies for protecting the optics of various optical devices, such as spotting scopes, telescopes, riflescopes, binoculars and night-vision devices.

Figure 1:
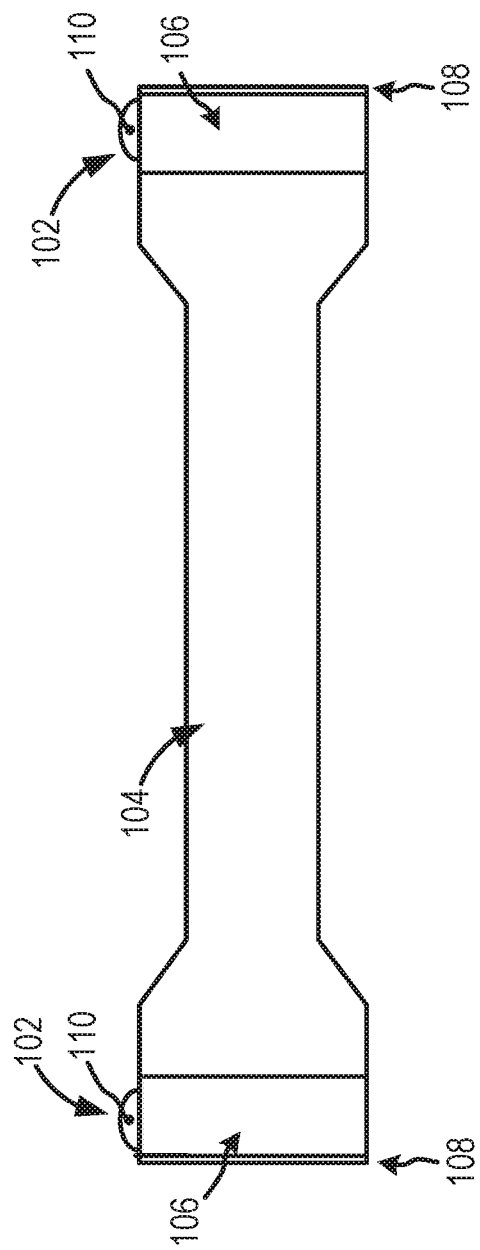
FIG. 1 is a schematic diagram of a side view of an adjustable lens cover assembly affixed to a riflescope, in accordance with embodiments of the present disclosure.

FIG. 1 is a schematic diagram of a side view of an adjustable lens cover assembly 102 affixed to a riflescope 104, in accordance with embodiments of the present disclosure. The adjustable lens cover assembly 102 may be adapted to cover, and thereby protect, the lenses of various optical devices, such as the riflescope 104 depicted in FIG. 1. For example, the adjustable lens cover assembly 102 may be adapted to fit on one or more ends of a spotting scope or riflescope 104. In embodiments, the lens cover assembly 102 may be configured to fit over various other optical devices, including, but not limited to, telescopes, binoculars, field microscopes, and the like.

In embodiments, the adjustable lens cover assembly 102 includes an adjustable lens cover body 106 and a lens cap 108. The adjustable lens cover body 106 has a generally circular configuration so that it may be placed over the generally circular shapes of optical devices, although other shapes are also contemplated as embodiments of the present disclosure (e.g., square, oval, rectangle, and the like). Independent of shape, the lens cover body 106 may have an open configuration when not engaged with an optical device. An open configuration may include a configuration where one end of the lens cover body 106 is not yet coupled to the other end of the lens cover body 106. However, once the ends are coupled to one another, the lens cover body 106 assumes a closed configuration, such that the ends are in close enough proximity to one another to facilitate secure placement of the lens cover body 106 over an external portion of an optical device, so that the lens cover body 106 may circumferentially engage an optical device.

To secure placement of the adjustable lens cover assembly 102 over an external portion of an optical device, a clamping mechanism 110 may be used. The clamping mechanism 110 may include one or more mechanisms that facilitate the coupling of one end of the lens cover body 106 to the other end of the lens cover body 106. In embodiments, the clamping mechanism 110 may include one or more of a screw mechanism, a threaded insert and screw mechanism, a pull-action clamp mechanism, a hook and screw clamping mechanism, a quick release mechanism, a ratcheting tie mechanism, latching teeth and release mechanism, or combinations thereof. In embodiments, the lens cover body 106 may not engage an external portion of an optical device in a manner that requires screw threads (e.g., non-threaded), or other similar mechanism that would preclude a single adjustable lens cover assembly 102 from accommodating a range of optical devices.

Once securely in position on the optical device, the lens cap 108 of the lens cover assembly may assume a closed or open position. For example, when a user wishes to use the optical device (e.g., to view a target), the user may manually release the lens cap 108 from its engagement with the lens cover body 106 so that the user's line of sight is no longer impeded by the lens cap 108 (as it would be when the lens cap 108 is in the closed position).

The lens cover assembly 102 of the present disclosure is adjustable in that a single lens cover body 106 may be used to cover and protect the lenses of a variety of optical devices (e.g., a variety of different riflescopes). In embodiments, the lens cover body 106 may be configured to accommodate optical devices having lenses within a certain size range, such as lenses having a certain range of circumferences or diameters, and/or the external portions of the optical devices having a certain range of circumferences or diameters. In embodiments, the lens cover body 106 may configured to circumferentially engage the external portions of optical devices having external diameters ranging from about 16 mm to about 20 mm, about 20 mm to about 24 mm, about 24 mm to about 28 mm, about 28 mm to about 32 mm, about 32 mm to about 36 mm, about 36 mm to about 40 mm, about 40 mm to about 44 mm, about 44 mm to about 48 mm, about 48 mm to about 52 mm, about 52 mm to about 56 mm, about 56 mm to about 60 mm, about 60 mm to about 64 mm, about 64 mm to about 68 mm, about 68 mm to about 72 mm, about 72 mm to about 76 mm, about 76 mm to about 80 mm, about 80 mm to about 84 mm, and about 84 mm to about 88 mm. Other sizes, shapes, and dimensions of the lens cover body 106 may also be used, as one of ordinary skill in the art would recognize based on the present disclosure.

In embodiments, the lens cover body 106 may have circumferences and/or diameters that are similar to the circumferences and/or diameters of the lenses and external portions of the optical devices described above, or slightly larger, such that the lens cover body 106 of the present disclosure may cover the lenses or optical devices. Additionally or alternatively, the lens cover body 106 may be from about 0.1 mm to about 10 mm thick, from about 0.1 mm to about 5.0 mm thick, from about 0.1 mm to about 2.0 mm thick, from about 0.1 mm to about 1.0 mm thick, from about 0.5 mm to about 10 mm thick, from about 0.5 mm to about 5.0 mm thick, from about 0.5 mm to about 2.0 mm thick, or from about 0.5 mm to about 1.0 mm thick. In embodiments, the lens cover body 106 may be from about 1.0 mm to about 50 mm wide, from about 1.0 mm to about 25 mm wide, from about 1.0 mm to about 10 mm wide, from about 1.0 mm to about 5.0 mm wide, from about 2.0 mm to about 50 mm wide, from about 2.0 mm to about 25 mm wide, from about 2.0 mm to about 10 mm wide, and from about 2.0 mm to about 5.0 mm wide.

The adjustable lens cover assembly 102 may be made of various materials, including, but not limited to, one or more of a metal, a metal alloy (e.g., aluminum, titanium, steel, stainless steel and any alloys thereof), plastic, a polymeric material, carbon fiber, rubber, wood or combinations thereof.

Figure 2A:
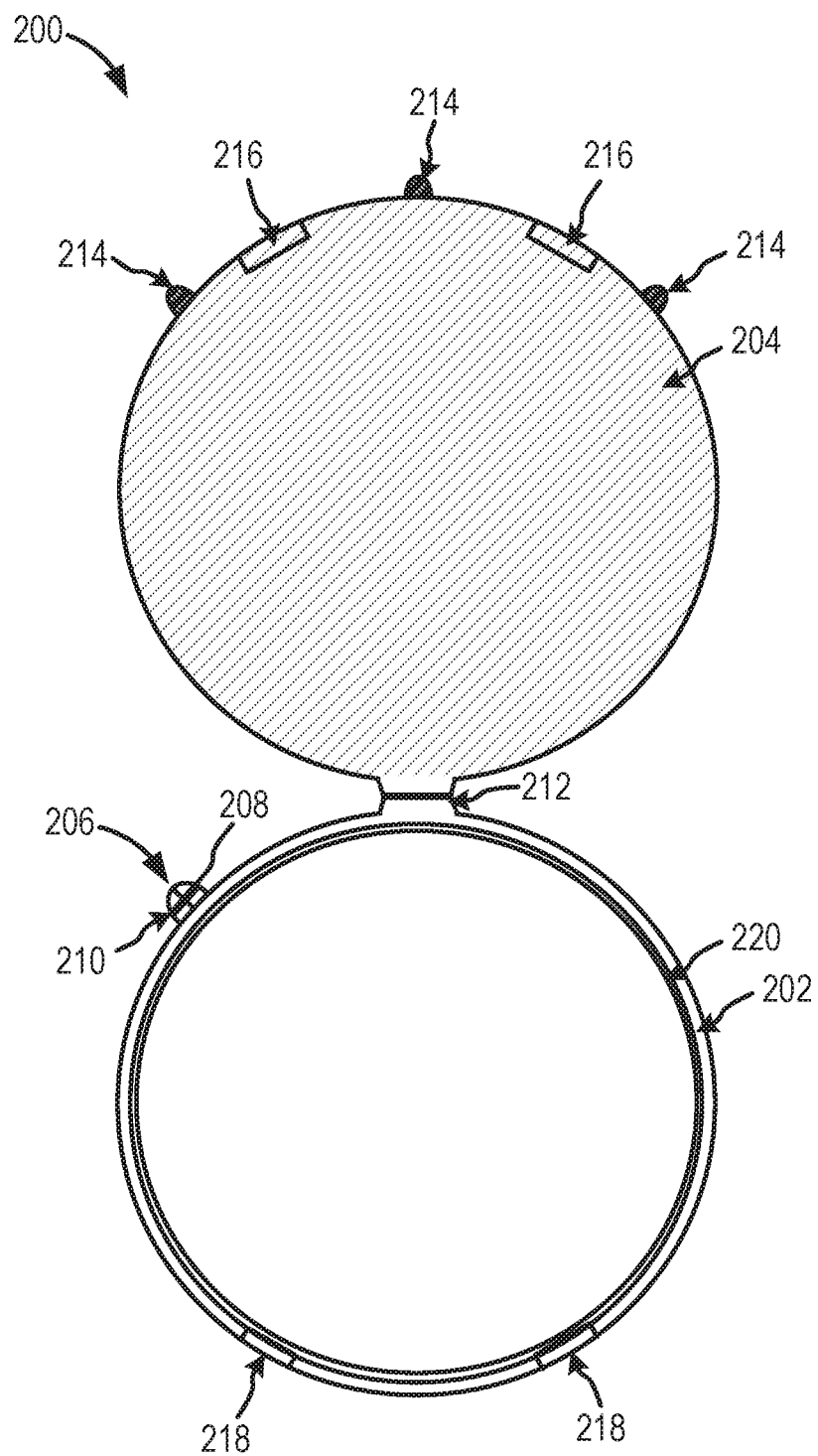
FIGS. 2A-2B are schematic diagrams of front views of an adjustable lens cover assembly, in accordance with embodiments of the present disclosure.
Figure 2B:
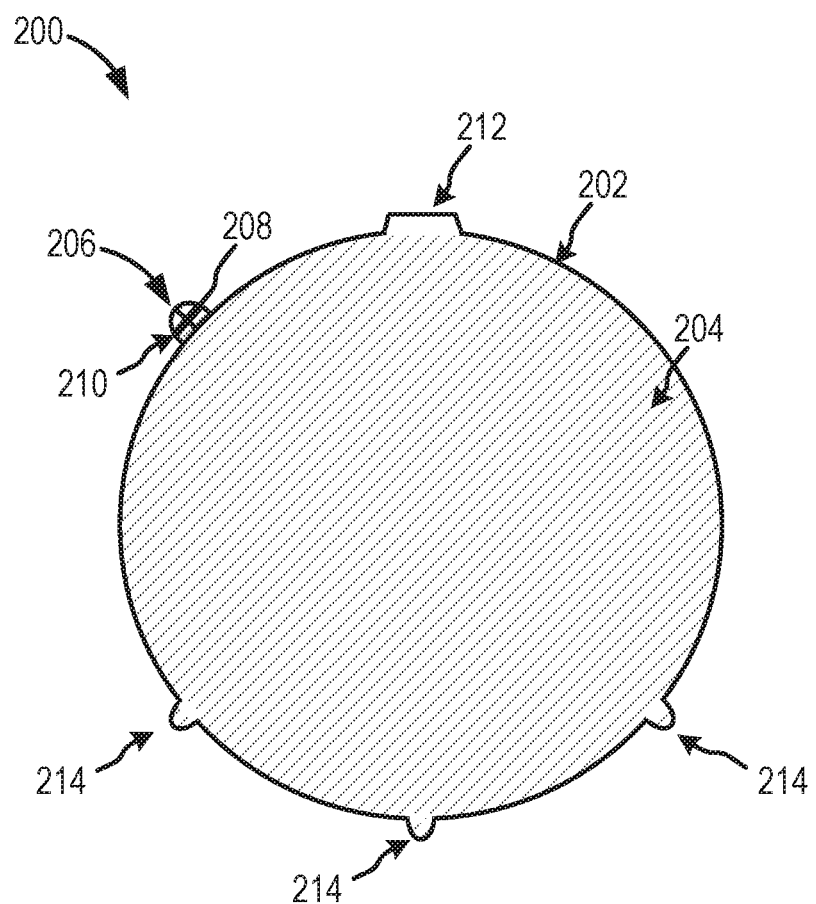

FIG. 2A is a schematic diagram of a front view of an adjustable lens cover assembly 200 in an open position, in accordance with embodiments of the present disclosure; and, FIG. 2B is a schematic diagram of a front view of the adjustable lens cover assembly 200 in a closed position, in accordance with embodiments of the present disclosure. The lens cover assembly includes a lens cover body 202 and a lens cap 204. In embodiments, the adjustable lens cover assembly 200 may be the same or similar to the adjustable lens cover assembly 102 depicted in FIG. 1. Additionally or alternatively, the lens cover body 202 may be the same or similar to the lens cover body 106 depicted in FIG. 1 and/or the lens cap 204 may be the same or similar to the lens cap 108 depicted in FIG. 1.

In embodiments, the lens cover body 202 may include a clamping mechanism 206. The clamping mechanism 206 may be the same or similar to the clamping mechanism 110 depicted in FIG. 1. The clamping mechanism 206 includes a threaded insert 208 in one end of lens cover body 202 and a screw port 210 in the other end of the lens cover body 202, such that the treaded insert 208 and the screw port 210 are functionally complementary. The user may adjust the placement of the lens cover body 202 over an external portion of an optical device by loosening/tightening a set screw that may be inserted into the screw port 210 and is complementary to the threads of the threaded insert 208. In this manner of operation, the set screw provides the clamping force to couple each end of the lens cover body 202. This feature of the lens cover body 202 enables the user to rotate freely in a circumferential manner the lens cover body 202 to a desired position and allows the lens cover body 202 to adaptably accommodate a variety of optical devices.

The adjustable lens cover assembly 200 may include a hinge mechanism 212 that facilitates the coupling of the lens cap 204 to the lens cover body 202. The hinge mechanism 212 may include one or more components typically used in the construction of hinges, including but not limited to, pins, plates, springs, axels, screws, and the like. In embodiments, the hinge mechanism 212 may be configured to bias the lens cap 204 in an open position, such that an opposing force is required to maintain the lens cap 204 in a closed position (engaged with the lens cover body 202). The hinge biasing mechanism may include one or more components designed to provide the force necessary to bias the lens cap 204 in an open position, including but not limited to, an enclosed spring, an elastic cushion, and the like.

In embodiments, the hinge mechanism 212 may include one or more components designed to be a mechanical stop to prevent the lens cap 204 from opening beyond a predetermined position. The mechanical stop may be provided by one or more inserts positioned just behind the lens cap 204, such as a cushioning insert. The mechanical stop may also be provided by one or more external ribs positioned so as to prevent an external portion of the lens cap 204 from further rotation.

In embodiments, the hinge mechanism 212 may include a damping mechanism or a damping insert to slow the movement of the lens cap 204 as it biased to assume the open position. For example, the damping mechanism may include a damping insert that provides the damping force to oppose the force created by the hinge mechanism. The damping insert may be mechanically-based (e.g., damping hinge, friction hinge, torque hinge, etc.) and/or the damping insert may be fluid-based (e.g., seals, hydraulics, etc.).

In embodiments, the adjustable lens cover assembly 200 may include one or more release tabs 214 for disengaging the lens cap 204 from the lens cover body 202. As illustrated in FIGS. 2A-2B, the release tabs 214 may be extensions of the lens cap 204 that are large enough for a user to engage with, and apply pressure to, so that the lens cap 204 disengages from the lens cover body 202. The release tabs 214 generally extend a certain distance beyond the underlying portions of the lens cover body 202, such that the user may engage a release tab 214 with one or more of the user's fingers. Using a release tab 214 to disengage the lens cap 204 from the lens cover body 202 exposes the lenses of the optical device and allows the user to have an unobstructed view through the scope. In embodiments, lens caps 204 may have 1, 2, 3, 4, 5, 6, 7, 8, etc. different release tabs 214 positioned asymmetrically or symmetrically around the periphery of the lens cap 204, thus providing the user with a wide variety of options for conveniently and comfortably opening the lens cap 204. In embodiments, one or more release tabs 214 may be positioned generally opposite of the hinge mechanism 212, as illustrated in FIGS. 2A-2B.

In embodiments, the adjustable lens cover assembly 200 may include one or more mechanisms for securing the lens cap 204 in the closed position so that, while in use, the lenses of the optical device will be protected from environmental factors that may damage the lenses or otherwise compromise the function of the lenses. For example, the lens cap 204 may include a magnetic coupling portion 216 that may include one or more magnets that magnetically engage with an attractive metal portion 218, opposite the magnetic coupling portion 216. The magnetic coupling portion 216 may be configured such that one or more magnets is located in the lens cap 204, and the attractive metal portion 218 is located in the lens cover body 202 or vice versa. In embodiments, the attractive metal portion 218 to which the magnetic coupling portion 216 may be magnetically engage is simply one or more portions of the lens cover body 202, rather than a metal flange. In embodiments, the magnetic coupling portion 216 and the attractive metal portion 218 may be one or more magnets having opposite poles such that they attract each other, with at least one magnet positioned in the lens cap 204 and the other magnet positioned in the lens cover body 202. The magnetic coupling portion 216 may include 1, 2, 3, 4, 5, 6, 7, 8, etc. separate magnets, which may be configured to be any variety of shape, size, or dimension, as one of skill in the art would recognize based on the present disclosure.

In embodiments, the adjustable lens cover body 202 may include one or more seals 220, such as O-ring seals, to facilitate a water-proof seal where the lens cover body 202 interfaces with an external portion of the optical device (e.g., the riflescope 104 of FIG. 1), and where the lens cap 204 interfaces with the scope cover body 202. In embodiments, an O-ring seal may be configured to engage a portion of the circumference of the inner portion of the lens cover body 202 and a portion of the circumference of the external portion of the optical device, such that when the clamping mechanism is activated, the O-ring seal prevents water from coming into contact with the one or more lenses of the optical device. In embodiments, an O-ring seal may be configured to engage a portion of the circumference of the inner portion of the lens cap 204, and a portion of the circumference of the inner portion of the lens cover body 202, such that when the lens cap is closed, the O-ring seal prevents water from coming into contact with the one or more lenses of the optical device. The one or more seals may be made of various materials, such as silicone or rubber, and may be secured in place using various adhesives, as one of ordinary skill would recognize based on the present disclosure.

Figure 3A:
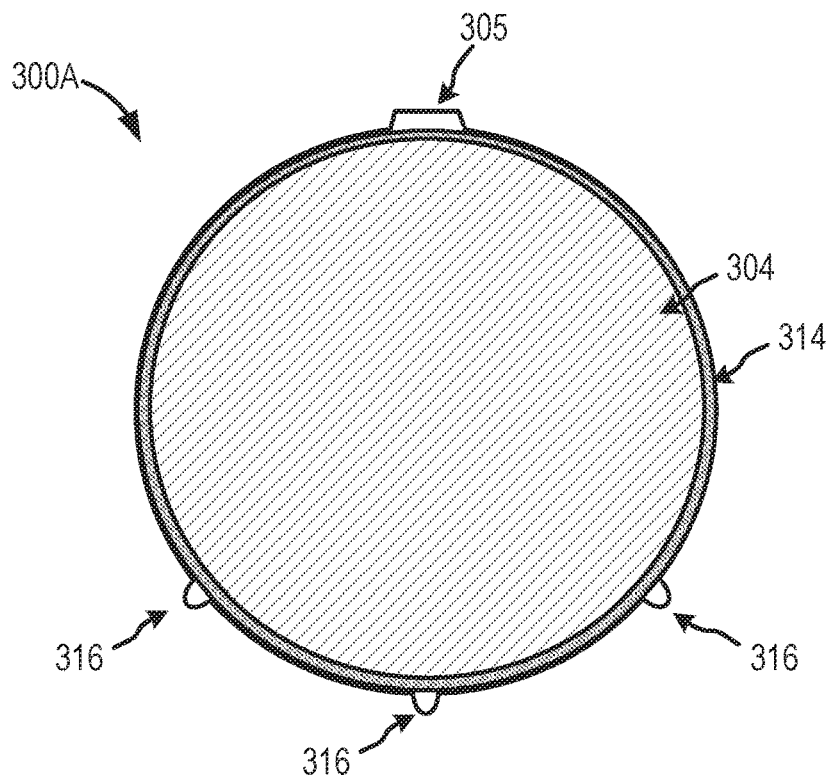
FIGS. 3A and 3B are schematic diagrams of front views of a two-part adjustable lens cover assembly, in accordance with embodiments of the present disclosure.
Figure 3B:
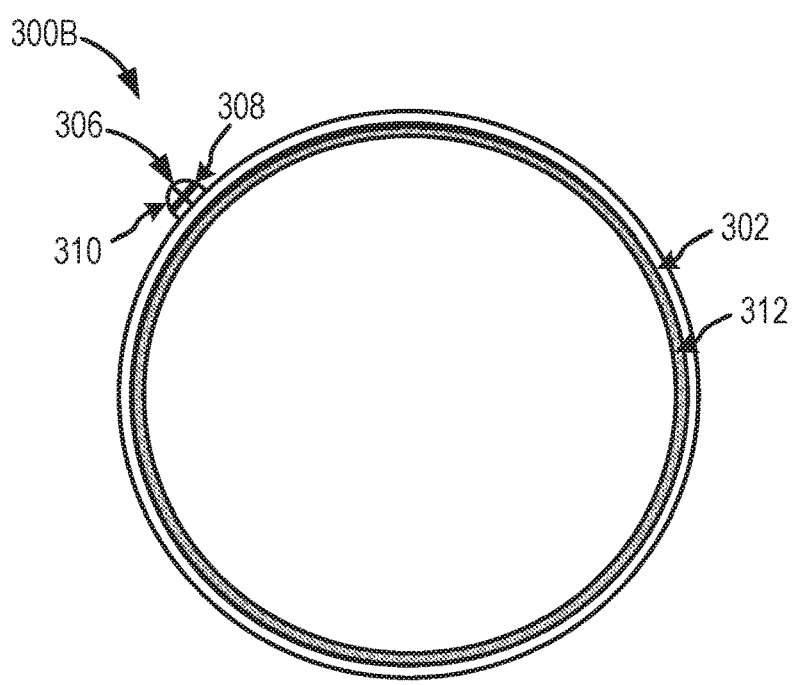

FIGS. 3A and 3B are schematic diagrams of front views of a two-part adjustable lens cover assembly 300A, 300B, in accordance with embodiments of the present disclosure. In embodiments, the two-part adjustable lens cover assembly 300A, 300B may include a lens cover body 302 and a lens cap 304. In embodiments the lens cover body 302 may be the same or similar to the lens cover body 202 depicted in FIGS. 2A-2B. Additionally or alternatively, the lens cap 304 may be the same or similar to the lens cap 204 depicted in FIGS. 2A-2B.

In embodiments, the lens cover body 302 may include clamping mechanism 306. The clamping mechanism may be the same or similar to the clamping mechanisms 110, 206 depicted in FIGS. 1 and 2A-2B. For example, the clamping mechanism 306 may include a threaded insert 308 in one end of lens cover body 302 and a screw port 310 in the other end of the lens cover body 302, such that the treaded insert 308 and the screw port 310 are functionally complementary. The user may adjust the placement of the lens cover body 302 over an external portion of an optical device by loosening/tightening a set screw that may be inserted into the screw port 310 and is complementary to the threads of the threaded insert 308.

In embodiments, the lens cap 304 may be a separate piece from the lens cover body 302. In embodiments, the lens cap 304 may include two portions joined by a hinge mechanism 305. One portion of the lens cap 304 may be configured to join to the lens cover body 302 and another portion of the lens cap 304 may be configured to protect an optical device from being damaged. To join the lens cap 304 to the lens cover body 302, the lens cover body 302 may include threading 312 located circumferentially around the lens cover body 302 that functionally threads onto and/or into threading 314 located circumferentially around the lens cap 304. In embodiments, the threading 312 may be located on an internal portion of the lens cover body 302 and the threading 314 may be located on an external portion of the lens cap 304. Alternatively, in embodiments, the threading 312 may be located on an external portion of the lens cover body 302 and the threading 314 may be located on an internal portion of the lens cap 304. The hinge mechanism 305 may be the same or similar to the hinge mechanism 212 depicted in FIGS. 2A-2B.

In embodiments, the lens cap 304 may include one or more release tabs 316 for disengaging the portion of the lens cap that covers and/or protects an optical device from being damaged and the portion the lens cap 304 including the threading 314. In embodiments, the release tabs 316 may be the same or similar to the release tabs 214 depicted in FIGS. 2A-2B.

Figure 4A:
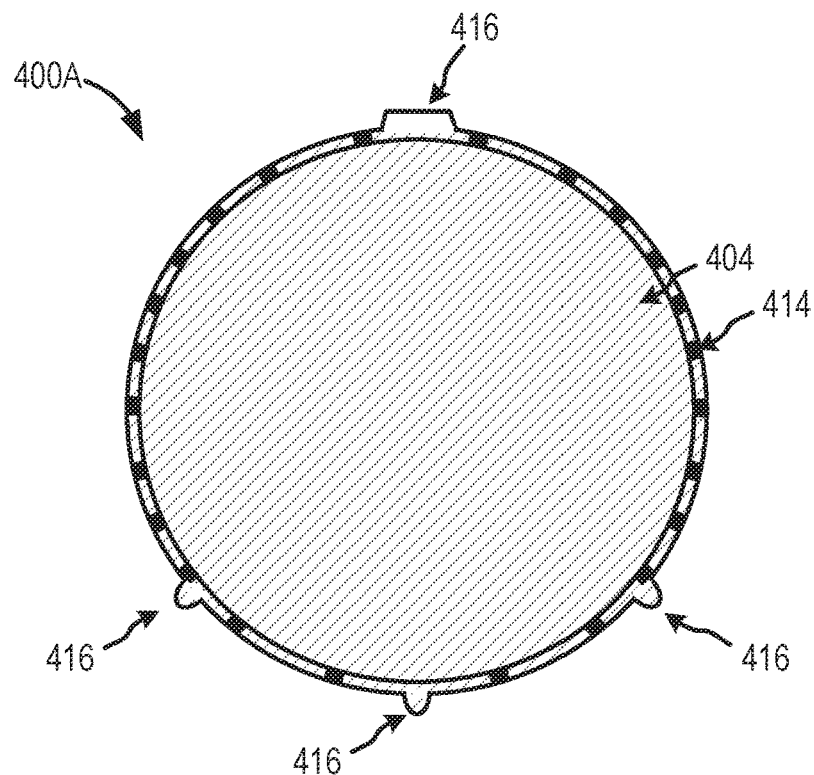
FIGS. 4A and 4B are schematic diagrams of front views of another two-part adjustable lens cover assembly, in accordance with embodiments of the present disclosure.
Figure 4B:
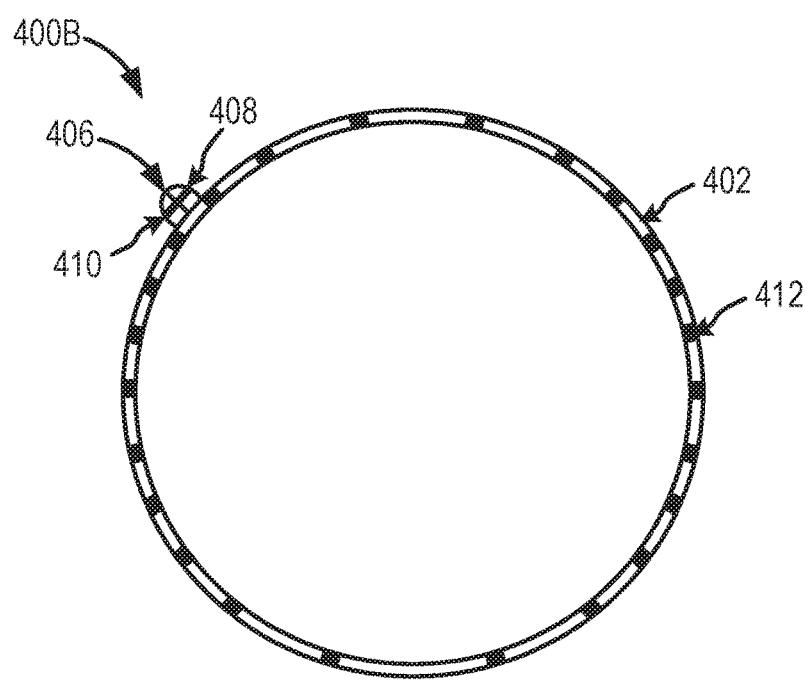

FIGS. 4A and 4B are schematic diagrams of front views of another two-part adjustable lens cover assembly 400A, 400B, in accordance with embodiments of the present disclosure. In embodiments, the two-part adjustable lens cover assembly 400A, 400B may include a lens cover body 402 and a lens cap 404. In embodiments the lens cover body 402 may be the same or similar to the lens cover body 202 depicted in FIGS. 2A-2B and/or the lens cover body 302 depicted in FIGS. 3A-3B. Additionally or alternatively, the lens cap 404 may be the same or similar to the lens cap 204 depicted in FIGS. 2A-2B and/or the lens cap 304 depicted in FIGS. 3A-3B.

In embodiments, the lens cover body 402 may include clamping mechanism 406. The clamping mechanism may be the same or similar to the clamping mechanisms 110, 206, 306 depicted in FIGS. 1, 2A-2B and 3. For example, the clamping mechanism 406 may include a threaded insert 408 in one end of lens cover body 402 and a screw port 410 in the other end of the lens cover body 402, such that the treaded insert 408 and the screw port 410 are functionally complementary. The user may adjust the placement of the lens cover body 402 over an external portion of an optical device by loosening/tightening a set screw that may be inserted into the screw port 410 and is complementary to the threads of the threaded insert 408.

In embodiments, the lens cap 404 may be a separate piece from the lens cover body 402. In embodiments, the lens cap 404 may include two portions joined by a hinge mechanism 405. One portion of the lens cap 404 may be configured to join to the lens cover body 402 and another portion of the lens cap 404 may be configured to protect an optical device from being damaged. To join the lens cap 404 to the lens cover body 402, the lens cover body 402 may include may include tabs 412 located circumferentially around the lens cover body 402 that are functionally complimentary to channels 414 located circumferentially around the lens cap 304. For example, the tabs 412 may slide into channels 414 and when either the lens cover body 402 or the lens cap 404 is turned clockwise or counterclockwise, the tabs 412 may slide into a channel of the lens cap 404 and be secured in place, so that the tabs 412 no longer line up with the channels 414. Alternatively, the lens cap 404 may include tabs and the lens cover body 402 may include channels. The hinge mechanism 405 may be the same or similar to the hinge mechanism 212 depicted in FIGS. 2A-2B and/or the hinge mechanism 305 depicted in FIGS. 3A-3B.

In embodiments, the lens cap 404 may include one or more release tabs 416 for disengaging the portion of the lens cap that covers and/or protects an optical device from being damaged and the portion the lens cap 404 including the channels 414. In embodiments, the release tabs 416 may be the same or similar to the release tabs 214 depicted in FIGS. 2A-2B and/or the release tabs 316 depicted in FIGS. 3A-3B.

Embodiments of the adjustable lens cover assemblies 102, 200, 300A, 300B, 400A, 400B may include a kit comprising one or more lens adjustable lens cover assemblies 102, 200, 300A, 300B, 400A, 400B for use on one or more ends of an optical device. In embodiments, a kit may include two lens cover assemblies, one lens cover assembly for each end of an optical device wherein one or more lenses of the optical device are exposed.

A number of variations and modifications of the disclosure may be used. It would be possible to provide for some features of the disclosure without providing others. The present disclosure, in various aspects, embodiments, and configurations, includes components, methods, processes, systems and/or apparatus substantially as depicted and described herein, including various aspects, embodiments, configurations, subcombinations, and subsets thereof. Those of skill in the art will understand how to make and use the various aspects, aspects, embodiments, and configurations, after understanding the present disclosure. The present disclosure, in various aspects, embodiments, and configurations, includes providing devices and processes in the absence of items not depicted and/or described herein or in various aspects, embodiments, and configurations hereof, including in the absence of such items as may have been used in previous devices or processes, for example, for improving performance, achieving ease and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more, aspects, embodiments, and configurations for the purpose of streamlining the disclosure. The features of the aspects, embodiments, and configurations of the disclosure may be combined in alternate aspects, embodiments, and configurations other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed aspects, embodiments, and configurations. Thus, the following claims are hereby incorporated into this Detailed Description, with each claim standing on its own as a separate preferred embodiment of the disclosure.

Moreover, though the description of the disclosure has included description of one or more aspects, embodiments, or configurations and certain variations and modifications, other variations, combinations, and modifications are within the scope of the disclosure, for example, as may be within the skill and knowledge of those in the art, after understanding the present disclosure. It is intended to obtain rights which include alternative aspects, embodiments, and configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. An optical lens cover assembly comprising:
   an adjustable lens cover body having an open circle configuration, wherein one end of the open circle of the lens cover body is couplable to the other end of the open circle of the lens cover body by a clamping mechanism, wherein the one end comprises a screw port and the other end comprises a threaded insert;
   a lens cap coupled to the lens cover body by a hinge mechanism, wherein the lens cap comprises a magnetic coupling portion for securing the lens cap in a closed position against the lens cover body, wherein the lens cap comprises at least one release tab for releasing the lens cap to expose one or more lenses of a plurality of optical devices, and wherein the lens cap forms a barrier between the one or more lenses of the plurality of optical devices and one or more environmental factors to protect the one or more lenses when the lens cap is in the closed position;

wherein the lens cover body is configured to be secured to the plurality of optical devices, the plurality of optical devices comprising a first optical device having a first size and a second optical device having a second size, the second size being different than the first size, the lens cover body being configured to circumferentially engage and rotate freely around an external portion the first optical device until a desired position on the first optical device is obtained, after which the clamp mechanism is configured to be activated, by tightening a single screw that is inserted through the screw port and into the threaded insert, to secure the lens cover body on the first optical device, and the lens cover body being configured to circumferentially engage and rotate freely around an external portion the second optical device until a desired position on the second optical device is obtained, after which the clamp mechanism is configured to be activated, by tightening the single screw is inserted through the screw port and into the threaded insert, to secure the lens cover body on the second optical device.

2. The lens cover assembly of claim 1, wherein the lens cover body is non-threaded.

3. The lens cover assembly of claim 1, wherein the lens cover body is configured to circumferentially engage the external portions of optical devices having external diameters ranging from about 16 mm to about 20 mm, about 20 mm to about 24 mm, about 24 mm to about 28 mm, about 28 mm to about 32 mm, about 32 mm to about 36 mm, about 36 mm to about 40 mm, about 40 mm to about 44 mm, about 44 mm to about 48 mm, about 48 mm to about 52 mm, about 52 mm to about 56 mm, about 56 mm to about 60 mm, about 60 mm to about 64 mm, about 64 mm to about 68 mm, about 68 mm to about 72 mm, about 72 mm to about 76 mm, about 76 mm to about 80 mm, about 80 mm to about 84 mm, and about 84 mm to about 88 mm.

4. The lens cover assembly of claim 1, wherein the hinge mechanism is configured to bias the lens cap in an open position and comprises one or more of an enclosed spring, an elastic cushion, or combinations thereof.

5. The lens cover assembly of claim 4, wherein the hinge mechanism further comprises a mechanical stop insert to prevent the lens cap from opening beyond a predetermined position.

6. The lens cover assembly of claim 4, wherein the hinge mechanism further comprises a damping insert to slow the movement of the lens cap to the open position.

7. The lens cover assembly of claim 1, wherein the magnetic coupling portion comprises one or more magnets in the lens cap that engage an attractive metal directly opposite the one or more magnets in a portion of the lens cover body.

8. The lens cover assembly of claim 1, wherein the magnetic coupling portion comprises one or more magnets in the lens cover body that engage with an attractive metal directly opposite the one or more magnets in a portion of the lens cap.

9. The lens cover assembly of claim 1, wherein the magnetic coupling portion is located in a position that is generally opposite that of the hinge mechanism.

10. The lens cover assembly of claim 1, wherein the at least one release tab is an extension of the lens cap and extends slightly beyond the underlying portion of the lens cover body when the lens cap is in the closed position.

11. The lens cover assembly of claim 1, wherein the at least one release tab is located in a position that is generally opposite that of the hinge mechanism.

12. The lens cover assembly of claim 1, further comprising at least one O-ring seal configured to engage the circumference of the inner portion of the lens cap and the circumference of the inner portion of the lens cover body such that when the lens cap is closed, the O-ring seal prevents water from coming into contact with the one or more lenses of the first optical device.

13. The lens cover assembly of claim 1, further comprising at least one O-ring seal configured to engage the circumference of the inner portion of the lens cover body and the circumference of the external portion of the first optical device such that when the clamping mechanism is activated, the O-ring seal prevents water from coming into contact with the one or more lenses of the first optical device.

14. The lens cover assembly of claim 1, wherein the first optical device is a scope, a sight, a riflescope, a spotting scope, a telescope, a field microscope, or binoculars.

15. The lens cover assembly of claim 1, wherein the lens cover body is comprised of one or more of a metal, a metal alloy, plastic, a polymeric material, carbon fiber, rubber, wood or combinations thereof.

16. The lens cover assembly of claim 1, wherein the lens cap is comprised of one or more of a metal, a metal alloy, plastic, a polymeric material, carbon fiber, rubber, wood or combinations thereof.

17. The lens cover assembly of claim 1, wherein the lens cover body is from about 0.1 mm to about 10 mm thick and from about 1.0 to about 50 mm wide.

18. A kit comprising one or more lens cover assembly of claim 1.

19. The kit of claim 18, wherein the kit comprises two lens cover assemblies of claim 1, one lens cover assembly for each end of the first optical device wherein one or more lenses of the first optical device are exposed.

20. An optical lens cover assembly comprising:
an adjustable lens cover body having an open circle configuration, wherein one end of the open circle of the lens cover body is couplable to the other end of the open circle of the lens cover body by a clamping mechanism;
a lens cap coupled to the lens cover body by a hinge mechanism, wherein the lens cap comprises a magnetic coupling portion for securing the lens cap in a closed position against the lens cover body, wherein the lens cap comprises at least one release tab for releasing the lens cap to expose one or more lenses of a plurality of optical devices, and wherein the lens cap forms a barrier between the one or more lenses of the plurality of optical devices and one or more environmental factors to protect the one or more lenses when the lens cap is in the closed position;
wherein the lens cover body is configured to be secured to the plurality of optical devices, the plurality of optical devices comprising a first optical device having a first size and a second optical device having a second size, the second size being different than the first size, the lens cover body being configured to circumferentially engage and rotate freely around an external portion the first optical device until a desired position on the optical device is obtained, after which the clamp mechanism is activated to secure the lens cover body on the first optical device, wherein the clamping mechanism comprises one or more of: a pull-action clamp mechanism, a hook and screw clamping mechanism, a quick release mechanism, a ratcheting tie mechanism, a latching teeth and release mechanism, or combinations thereof, and the lens cover body being configured to circumferentially engage and rotate freely around an external portion the second optical device until a desired position on the optical device is obtained, after which the clamp mechanism is activated to secure the lens cover body on the second optical device.

\* \* \* \* \*